United States Patent
Crowe et al.

(10) Patent No.: US 7,346,485 B2
(45) Date of Patent: Mar. 18, 2008

(54) MODELING AN EVENT USING LINKED COMPONENT MODULES PROVIDED IN A SPREADSHEET ENVIRONMENT

(75) Inventors: Trevor L. Crowe, Snohomish, WA (US); Christopher A. Forgie, Mercer Island, WA (US); Scott H. Mathews, Seattle, WA (US); Kyle M. Nakamoto, Kent, WA (US)

(73) Assignee: The Boeing Company, Chicago, IL (US)

( * ) Notice: Subject to any disclaimer, the term of this patent is extended or adjusted under 35 U.S.C. 154(b) by 470 days.

(21) Appl. No.: 10/705,030

(22) Filed: Nov. 11, 2003

(65) Prior Publication Data

US 2005/0102127 A1   May 12, 2005

(51) Int. Cl.
G06F 9/45       (2006.01)
G06F 17/30      (2006.01)
G06Q 10/00      (2006.01)
G06Q 40/00      (2006.01)
G06G 20/00      (2006.01)
G07G 1/00       (2006.01)

(52) U.S. Cl. .............................. 703/22; 705/1; 705/10; 705/36 R

(58) Field of Classification Search .................. 703/22; 707/100; 705/35
See application file for complete search history.

(56) References Cited

U.S. PATENT DOCUMENTS 6,073,115 A * 6/2000 Marshall ...................... 705/35

6,282,551 B1    8/2001  Anderson et al.
2003/0028863 A1  2/2003  Reichenthal
2003/0115207 A1* 6/2003  Bowman et al. ............ 707/100

OTHER PUBLICATIONS

William C. Cheng, Leana Golubchik; *Bolshoi—A Modeling Spreadsheet (Improving Usability of Complex Analytical Modeling Tools)*; Mar. 2000; 16 pages; Technical Resport CS-TR-4110; Department of Computer Science, University of Maryland at College Park, Maryland.

*ModelCenter® Product Overview*; Phoenix Integration; 2002; Selected pages; Phoenix Integration, Inc., Blacksburg, Virginia; available at <http://www.phoenix-int.com> (visited Jan. 24, 2003), no month.

Jack Zentner, Peter W.G. De Baets, Dimitri N. Mavris; *Formulation of an Integrating Framework for Conceptual Object-Oriented Systems Design*; 2002; 11 pages; 2002-01-2955; SAE International, no month.

(Continued)

*Primary Examiner*—Paul Rodriguez
*Assistant Examiner*—Nithya Janakiraman
(74) *Attorney, Agent, or Firm*—Alston & Bird LLP

(57) ABSTRACT

A method includes providing a plurality of component modules in a spreadsheet environment. Each component module is capable of modeling a portion of an event and includes at least one process. Each component module can be accessed independent of the other component modules, and at least one component module includes at least one input and at least one component module includes at least one output. The inputs and the outputs can be linked to thereby model the event. Thereafter, the processes of the component modules can be performed to simulate the event.

33 Claims, 9 Drawing Sheets

OTHER PUBLICATIONS

TeamVision™ Empowering Innovation™—TeamVision Framework CT; 1999-2001; Selected Pages; TeamVision Corporation; available at <http://www.teamvisioninc.com/home.php?Action=products_fct_pro> (visited Jan. 24, 2003), no date.

NumericBase—Object oriented spreadsheet; 2001; Selected Pages; NumericBase Inc.; available at <http://www.numericbase.com> (visited Oct. 17, 2002), no month.

Skip Ellis, Carlos Maltzahn; *Collaboration with Spreadsheets*; 10 pages; Department of Computer Science, University of Colorado at Boulder, Boulder, Colorado, no date.

Rebecca A. Walpole, Margaret M. Burnett; *Similarity Inheritance: A New Model of Inheritance for Spreadsheet Languages*; Nov. 1997; 11 pages; TR 97-60-15; Oregon State University.

* cited by examiner

| | A | B | C | D | E | F | G | H |
|---|---|---|---|---|---|---|---|---|
| 10 | | $0 | 0 | $0 | $0 | $0 | | |
| 11 | | $0 | 0 | $0 | $0 | $0 | | |
| 12 | | | | | | | | |
| 13 | Child Node Cost/Risk Inputs | Dist | Maturity | Point Est. | Low | High | | |
| 14 | Technology1 | $372,846 | TRL 8 | $500,000 | $320,000 | $900,000 | | |
| 15 | Technology2 | $538,231 | TRL 6 | $400,000 | $220,000 | $988,000 | | |
| 16 | Technology3 | $393,497 | TRL 4 | $500,000 | $250,000 | $1,580,000 | | |
| 17 | Technology4 | $244,935 | TRL 6 | $200,000 | $110,000 | $494,000 | | |
| 18 | Technology5 | $1,125,315 | TRL 4 | $500,000 | $250,000 | $1,580,000 | | |
| 19 | Technology6 | $620,619 | TRL 4 | $300,000 | $150,000 | $948,000 | | |
| 20 | Technology7 | $17,389 | TRL 6 | $10,000 | $5,500 | $24,700 | | |
| 21 | Technology8 | $3,336,801 | TRL 6 | $1,500,000 | $825,000 | $3,705,000 | | |
| 22 | | $0 | 0 | $0 | $0 | $0 | | |
| 23 | Total Child Node Costs | $6,649,633 | | $3,910,000 | $2,130,500 | $10,219,700 | | |
| 24 | | | | | | | | |
| 25 | | | | | | | | |
| 26 | Total Node Technology Cost/Risk | $8,244,048 | | | | | | |
| 27 | Cost Risk Mean | $6,961,696 | | | | | | |
| 28 | Cost Risk StDev | $867,220 | | | | | | |
| 29 | Cost Risk Curve Type | 4 | | | | | | |

FIG. 10.

MODELING AN EVENT USING LINKED COMPONENT MODULES PROVIDED IN A SPREADSHEET ENVIRONMENT

FIELD OF THE INVENTION

The present invention generally relates to systems, methods and computer program products for modeling events and, more particularly, relates to systems, methods and computer program products for modeling events in a spreadsheet environment.

BACKGROUND OF THE INVENTION

In the current working environment, spreadsheet software packages, such as Microsoft Excel, are used for the development of models, such as financial models. In this regard, spreadsheet software packages provide a number of useful features that allow for rapid prototyping of models. This is especially important since model developers are constantly generating models to try out new ideas. As will be appreciated, spreadsheet software packages provide a structure to manage data that is familiar to many developers and others. In addition, since various spreadsheet software packages, including Excel, have been packaged with a programming language, such as Visual Basic for Applications (VBA), such spreadsheet software packages have become an even more powerful development tool.

Since many spreadsheet software packages incorporate both data management and programming, spreadsheet software packages often make excellent prototyping engines. In this regard, spreadsheets allow for easy layout of data, and for performing complex calculations. Spreadsheet software packages also often provide a graphical user interface that is comfortable to most users, with programming language additions, such as VBA forms, facilitating quick generation of user-defined graphical user interfaces. In addition, programming within the spreadsheet environment often allows the user to control the flow of calculations, and the spreadsheet environment often allows the user to create complex functions.

With such features, many users often use spreadsheet software packages to create very large complex models. These models are typically "evolutionary" in that they have the ability to change over time. In this regard, because many users encounter similar problems, such users would benefit from reuse of the same model. However, since such models are so specialized, they must typically be modified to each new problem. And because models are typically large, they are often difficult to modify. As such, in many cases, modifications to a model are added on top of the existing model structure. Over time, however, the model has a tendency to become bloated with many features and/or calculations that were at one time important but are no longer needed. As will be appreciated, such bloating often makes models difficult to maintain.

Because of the difficulty in maintaining such models, they are usually operated by only a small number of users. But the inputs required for operation of such models are usually spread across multiple organizations. As such, the small number of users of the models must typically track down all of the required data in the respective organizations. Such a process can be time consuming and tedious for the users. In addition, although spreadsheet models are generally easy to use because they combine both data and code, combining data and code typically makes such models huge interconnected masses that further increases the difficulty in reusing the models.

SUMMARY OF THE INVENTION

In light of the aforementioned drawbacks of conventional spreadsheet models, embodiments of the present invention provide systems, methods and computer program products for modeling an event in a spreadsheet environment. Embodiments of the present invention are capable of breaking up event into smaller components that can be linked or otherwise associated with one another to create a model of the event. By creating smaller components, the individual components can be tested faster and more thoroughly. A model composed of small components is also easier to reuse because various components can be more easily substituted with other components. Creating smaller components may also remove some of the bloating making the model smaller and more user-friendly. With easily substituted components, each component can more easily be obtained from individual organizations. Thus not only can inputs be gathered from these different organizations, but results from their own models can be fed into an overall model.

Advantageously, embodiments of the present invention include a controller module capable of managing the component modules in modeling the event. In this regard, the controller module is capable of organizing a model to include a number of component modules, and linking the outputs of the component modules to the inputs. Advantageously, the controller module, as well as the component modules, can be implemented in a spreadsheet environment, thereby not requiring a separate software package to control the various components. In this regard, each component module can be accessed independent of the other component modules and the controller module after the inputs and outputs are linked. As such, the component modules are capable of being presented by a display such that one or more of the component modules can be individually analyzed independent of the remaining component modules. Further, the component modules are capable of being modified independent of the remaining component modules.

According to one aspect of the present invention, a method is provided that generally includes providing a plurality of component modules that are each capable of modeling a portion of an event and include at least one process. Each component module, which can comprise a spreadsheet workbook, is capable of being accessed independent of the other component modules, and at least one component module includes at least one input and at least one component module includes at least one output. The method also includes linking the inputs and the outputs via a controller module, which can also comprise a spreadsheet workbook, to thereby model the event. More particularly, linking the inputs and outputs can include hard linking at least one input to at least one output, and/or soft linking at least one input to at least one defined default value. In addition to linking the inputs and the outputs, the method can include accessing at least one of the component modules independent of the other component modules and the controller module. In this regard, the component modules can be accessed such that the accessed component modules can be displayed.

The method can also include providing a controller module, and adding a reference to each of the plurality of component modules such that the controller module is capable of linking the at least one input of at least one component module to the at least one output of the at least one component module. Additionally, or alternatively, the method can include accessing at least one of the component modules independent of the other component modules, and altering content of the accessed at least one component module by adding content to, deleting content from, and/or modifying content of, the accessed component module. The method can further include accessing the controller module such that the controller module can be displayed, where the display of the controller module includes a graphical representation of the plurality of component modules. In this regard, each graphical representation can include a reference to a respective component module and include a graphical representation of the links between the inputs and the outputs.

The method can further include performing the process(es) of the component modules to thereby simulate the event, such as according to a Monte Carlo method. In this regard, after linking the inputs and outputs, the processes of the component modules can be performed. Performing the process(es) of a component module may generate outputs capable of being provided as inputs of a separate component module. And when at least one input is soft linked to a defined default value, performing the processes can further include providing the defined default value to the soft linked input. Before and/or after performing the processes, and after linking the inputs to the outputs, at least one of the component modules can be accessed independent of the other component modules and the controller module.

In accordance with exemplar embodiments of the present invention, in the context of financial modeling, the plurality of component modules can include a component module for modeling a market value, a component module for modeling a nonrecurring cost, and a component module for modeling a market including future revenues. In such instances, the processes of the component modules can be simulated to thereby model the market value based on future revenues and nonrecurring cost. Also in the context of financial modeling, for example, the plurality of component modules can include a component module for modeling profitability, a component module for modeling cost, and a component module for modeling a market including future demand. In this regard, the processes of the component modules can be simulated to thereby model the profitability based on demand and cost.

According to other aspects of the present invention, a system and computer program product are provided, such as for modeling and/or simulating an event in a spreadsheet environment.

BRIEF DESCRIPTION OF THE DRAWINGS

Figure 1:
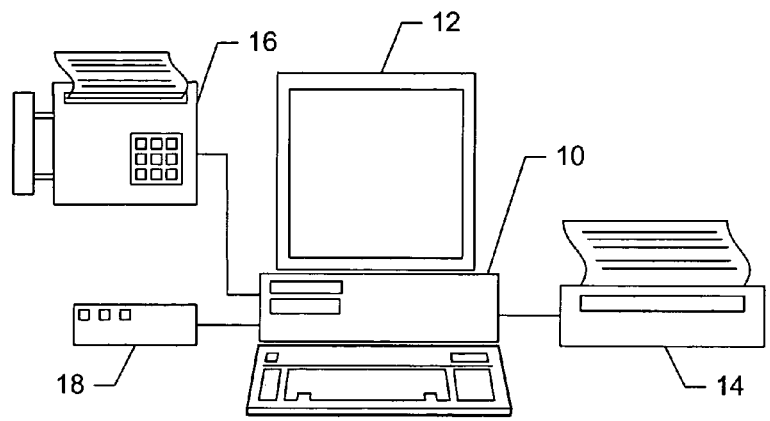
Figure 2:
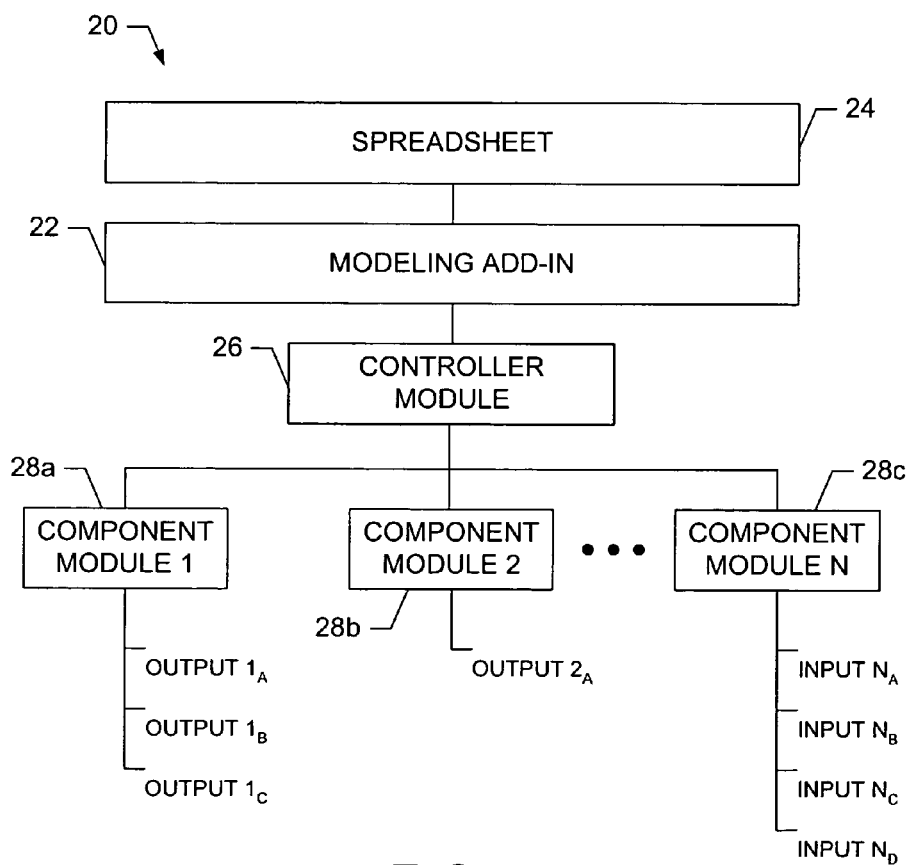
Figure 3:
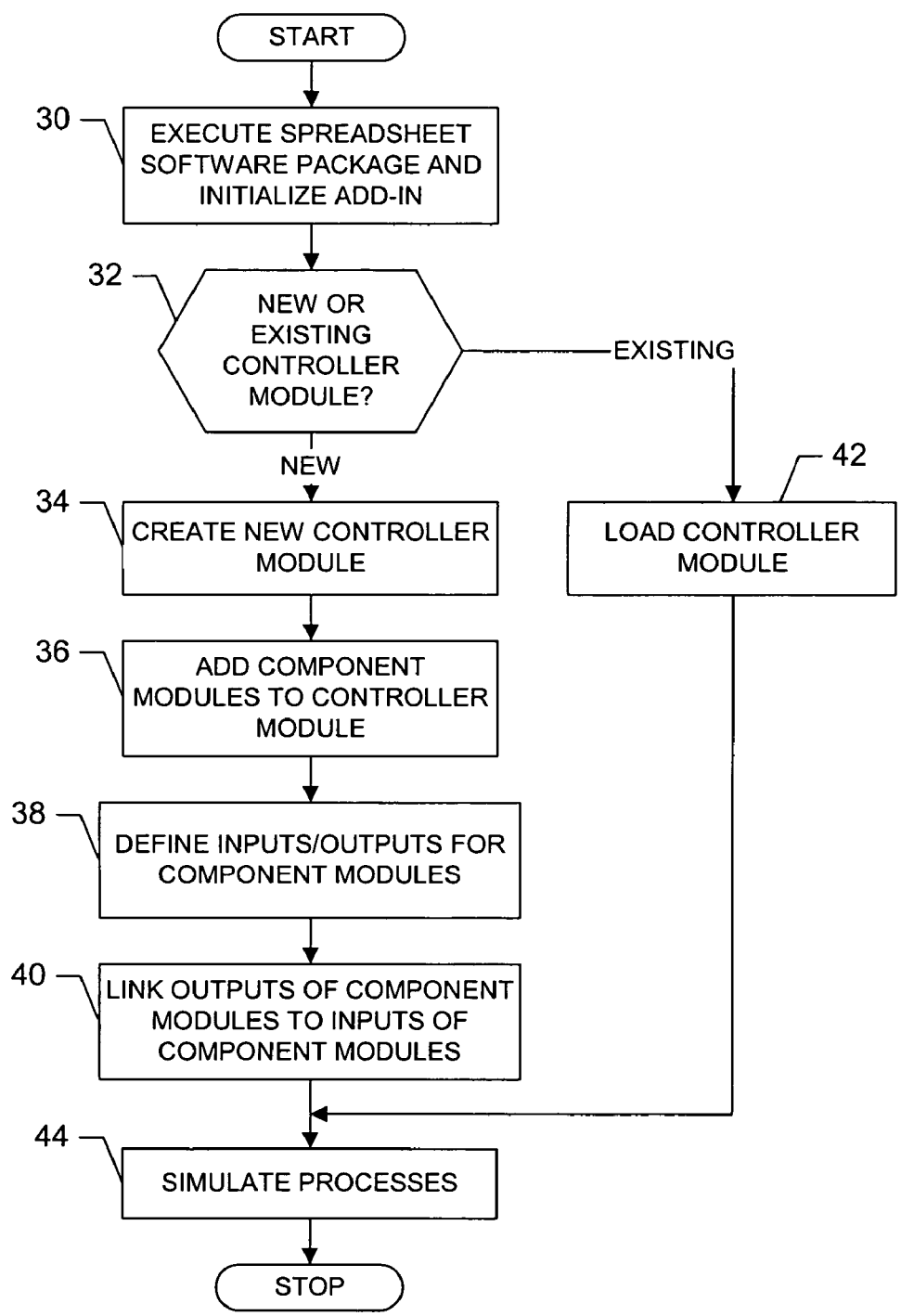

Having thus described the invention in general terms, reference will now be made to the accompanying drawings, which are not necessarily drawn to scale, and wherein:

FIG. 1 is a schematic block diagram of a system for modeling an event in a spreadsheet environment, according to one embodiment of the present invention;

FIG. 2 is a schematic block diagram of the architecture of the system of one embodiment of the present invention;

FIG. 3 is a flowchart illustrating various steps in a method of modeling, and thereafter simulating, an event in a spreadsheet environment, according to one embodiment of the present invention; and FIGS. 4-11 are exemplar presentations of a display of the system operating in accordance with one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As well appreciated by those skilled in the art, spreadsheet software packages simulate paper spreadsheets, which generally comprise a number of cells organized in rows and columns. More particularly, spreadsheet software packages simulate paper spreadsheets by capturing, displaying and manipulating data within cells. Within a spreadsheet software package, one or more spreadsheets, often referred to as worksheets, may be included within a workbook. Each worksheet typically includes a plurality of cells, where each cell may labeled according to its placement (e.g., A1, A2, A3, etc.) or have a defined name. Further, each cell is typically adapted to receive and hold content including, for example, numerical data, equations, short text strings or the like, where the content may have an absolute or relative reference to one or more cells around it. Although the terms "workbook," "worksheet" an "cell" are used herein to describe elements of spreadsheet software packages, it should be understood that any of a number of terms can be utilized to describe like elements without departing from the spirit and scope of the present invention.

Embodiments of the present invention provide systems, methods and computer program products for modeling an event in a spreadsheet environment. As will be appreciated, embodiments of the present invention can be capable of modeling any of a number of different types of events including, for example, one or more processes, objects, situations or the like. In one advantageous technique applicable to embodiments of the present invention, the methods according to embodiments of the present invention may be embodied in a software or data module, component, portfolio or the like, that can be manipulated or otherwise operated within a spreadsheet software package such as Microsoft Excel, distributed by Microsoft Corporation of Redmond, Washington. Such a technique may be advantageous in a number of different contexts, such as in the context of financial modeling and analysis. In this regard, modules, components and/or portfolios that perform various financial modeling functions can be combined to gain a more complete understanding of a financial context.

According to the method of one advantageous embodiment of the present invention, data capable of being manipulated to model an event, such as a financial process, can be embodied in component modules. The component modules can then be linked or otherwise associated with one another by a controller module so as to formulate a complete model of the event. For example, a future revenue model can be embodied in one component module while a nonrecurring cost model can be embodied in another component module. A model controller can then link or otherwise associate the two component modules with a third component module to formulate a financial model of the market value of a good based upon the future revenues and the nonrecurring cost.

As explained herein, each component module can comprise a portion of a model. In this regard, each component module can include one or more processes, such as one or more operations, calculations or the like, capable of being performed, such as to simulate a respective portion of the event. In aggregate, the component modules can be capable of modeling the event. As such, the processes of the component models can be performed in aggregate, such as to simulate the event. Advantageously, each component module may include process(es) capable of being performed in a manner that generates a useful result capable of being analyzed by a user of the system. It should be understood, however, that one or more component modules can include one or more processes capable of being performed in aggregate with the process(es) of the other component modules to comprise the processes performed to thereby simulate the event, for example. In such instances, the more than one process of the component modules can be performed to generate one or more useful results. Also, it should be understood that one or more component modules can include a portion of a process capable of being performed, in aggregate, with the process(es) and/or portions of processes of the other component modules to comprise the processes performed to thereby simulate the event, for example. Thus, an intermediate output can be generated by performing portion(s) of the process(es) of one or more component modules, where the intermediate output can be capable of being input into one or more other component modules to generate a useful result.

The component modules can be created in any of a number of different manners to model portions of the event. In one advantageous embodiment, however, the component modules are created in accordance with an object-based technique for breaking down a model of an event. As will be appreciated, such as technique can be based upon object-oriented programming techniques for software development that promote reusability and testability of software. In alternative embodiments, the component modules can be created in accordance with techniques for breaking down a model by process, organization or the like. In this regard, using techniques for breaking down a model by organization facilitate a model of the event being assembled from different organizations. And since each organization may be more likely to have an existing model that can comprise a component or portion of a model of the event, the existing models can more readily be aggregated to model the event.

As shown in FIG. 1, the system of one embodiment of the present invention is typically embodied by a processing element and an associated memory device, both of which are commonly comprised by a computer 10 or the like. In this regard, as indicated above, the method of embodiments of the present invention can be performed by the processing element manipulating data stored by the memory device with any one of a number of commercially available computer software programs. In one embodiment, the method can be performed with data that is capable of being manipulated and/or presented in spreadsheet form. For example, the method can be performed by the processing element manipulating data stored by the memory device with the Excel spreadsheet software package, including Crystal Ball, a Monte Carlo simulation software program distributed by Decisioneering, Inc. of Denver, Colo. The computer can include a display 12 for presenting information relative to performing embodiments of the method of the present invention, including the various distributions, models and/or conclusions as determined according to embodiments of the present invention. To plot information relative to performing embodiments of the method of the present invention, the computer can further include a printer 14.

Also, the computer 10 can include a means for locally or remotely transferring the information relative to performing embodiments of the method of the present invention. For example, the computer can include a facsimile machine 16 for transmitting information to other facsimile machines, computers or the like. Additionally, or alternatively, the computer can include a modem 18 to transfer information to other computers or the like. Further, the computer can include an interface (not shown) to a network, such as a local area network (LAN), and/or a wide area network (WAN). For example, the computer can include an Ethernet Personal Computer Memory Card International Association (PCM-CIA) card configured to transmit and receive information to and from a LAN, WAN or the like.

Reference is now drawn to FIG. 2, which illustrates the functional architecture 20 of a system for modeling an event (e.g., one or more processes, objects, situations, etc.) in a spreadsheet environment according to one embodiment of the present invention. In this regard, as used herein, the architecture is referred to as the "Structured Spreadsheet Modeling Architecture" (SSMA). The SSMA typically includes a modeling add-in 22, which is coupled to a spreadsheet software package 24, such as Excel. In this regard, the modeling add-in may functionally comprise an Excel add-in program (i.e., *.xla). The modeling add-in can contain the functions and sub-routines necessary for the system to model the event in the spreadsheet software package. More particularly, the modeling add-in can direct a controller module 26 to control one or more component modules 28a-28c, all of which are described further below.

The controller module 26 operates to manage or control one or more component modules, three of which are shown in FIG. 2 identified as component modules 28a-28c. The controller module, which may functionally comprise a spreadsheet workbook (e.g., Excel *.xls files), can manage the component modules in modeling an event. In this regard, the controller module can specify those component modules utilized in the model, as well as the interoperation of the various component modules with one another, as described below. In addition, the controller module can also provide a user interface to the event being modeled by the system. More particularly, the controller module may provide a user interface capable of presenting graphical representations of the component modules included in the model, each with a reference to the respective component module. In addition, the controller module can present a graphical representation illustrating the interoperation between the various components.

The component modules 28a-28c are typically viewed as the building blocks of the model of an event. Each component module managed by the controller module 26 comprises a portion of the model of the event. In this regard, each component module can include a number of different pieces of content such as, for example, text strings, numerical values, mathematical expressions or the like. More particularly, each component module can include one or more processes capable of being performed to, for example, simulate a portion of the event, where one or more of the results of the process(es) of a component model may affect the results of the process(es) of one or more of the other component modules. Each component module can include one or more processes that require a result generated by performing one or more processes of one or more of the other component modules to thereby produce a useful result. In one typical embodiment, however, one or more component modules include process(es) capable of being performed to generate one or more useful result(s) independent of the results of the process(es) performed by the other component modules. For example, consider a financial model of market value of a good based on future revenues and nonrecurring costs, where the market value, future revenues and nonrecurring cost models are each embodied in a separate component module. In such an instance, the component modules for modeling future revenues and nonrecurring costs can each provide a useful result (e.g., future revenues and nonrecurring cost, respectively), independent of the financial model of market value.

Like with the controller module 26, the component modules 28a-28c may also functionally comprise spreadsheet workbooks (e.g., Excel *.xls files). In such an embodiment, the modeling add-in 22 may distinguish between the controller module and the component modules in any of a number of different manners, such as by identifying a unique workbook file property associated with the controller. Advantageously, because each component module can functionally comprise a spreadsheet workbook, each component module comprising a portion of the model of the event can be manipulated independent of the other components. In this regard, pieces of content are capable of being added to, deleted from, and/or modified within, each component module independent of the other component modules. In the example where a market value model, future revenue model and nonrecurring cost model are each embodied in a separate component module, any one or more of the modules can be manipulated independent of any of the other modules. Also, each component module can be presented, such as by display 12, independent of the other components.

To interoperate the component modules 28a-28c with one another, each component module includes one or more predefined inputs and/or one or more predefined outputs, each of which may functionally comprise a range of one or more spreadsheet cells. More particularly, at least one component module includes a predefined input, and at least one component module includes a predefined output referenced by the predefined input. The inputs and outputs can be identified within the component modules in any of a number of different manners. In one embodiment where each input and output comprises a range of one or more spreadsheet cells, for example, each input and output can be identified by a defined name or other identifier associated with the respective input and output. Alternatively, each input and output can be identified by a name associated with a given range of spreadsheet cell(s) with an appended prefix or other identifier identifying the range as an input or an output. For example, each input can be identified by the prefix "exti_," where "exti_" identifies the prefix as defining an input (e.g., "exti_MarketSize"). Also, for example, each output can be identified by the prefix "exto_," where "exto_" identifies the prefix as defining an output (e.g., "exto_Price").

In accordance with embodiments of the present invention, one or more predefined inputs of one or more component modules 28a-28c may be linked or otherwise associated with one or more predefined outputs of one or more component modules. By linking or otherwise associating the predefined inputs and outputs of the various component modules with one another, different models may be generated and thereafter simulated. The inputs/outputs of the component modules may be linked or otherwise associated with one another in any of a number of different manners. As will be appreciated by those skilled in the art, in spreadsheet software packages such as Excel, workbooks can be linked together such that a range of one or more cells in one workbook, (e.g., "Workbook 1") may be set equal to a range of one or more cells in another workbook (e.g., "Workbook 2"). In Excel, workbooks may be linked by adding the full pathname of "Workbook 2" in the reference to the respective range of cell(s) in "Workbook 1." For example, an equation in cell A1 in "Workbook 1" may comprise "=‘[C:\My Documents\Workbook 2.xls’]Sheet 1!B2," where "[C:\My Documents\Workbook 2.xls]Sheet 1" represents the pathname for locating the other workbook (i.e., "Workbook2, Sheet 1"). Also in the preceding, "B2" represents cell B2 in "Workbook 2 on Sheet 1" such that the equation in cell A1 links cell A1 to the content held in cell B2.

After the inputs/outputs of the component modules 28a-28c have been linked or otherwise associated with one another, the SSMA 20 is capable of determining the input by referring to the linked output, typically while the spreadsheet 24 is operating the respective component modules. For example; the content in cell A1 of Workbook1 can be determined by referring to cell B1 of Workbook2. Thus, when the content of cell B2 changes, the SSMA is capable of replicating the same change in cell A1, which as indicated above, is linked to cell B2.

Conventionally, if the linked cell refers to a cell in a workbook that has been moved or deleted, errors in determining the values for the linked cells can occur. To account for component modules 28a-28c, and thus linked inputs/outputs, being moved or deleted, the SSMA 20 of embodiments of the present invention defines default content for each input, in instances in which an output that is otherwise to be linked to an input has been moved or deleted. Each time the modeling add-in 22 opens the controller module 26, the controller module can respond by opening all of the respective component modules and linking the inputs/outputs of the component modules together. Typically, however, only those component modules that the controller module can locate are linked together, with those component modules that have been moved or deleted excluded from the linking operation. In place of the content of the linked outputs in component modules that have been moved or deleted, the SSMA is capable of inserting a defined default value into the respective input.

By defining a default value for each linked input, the SSMA 20 of embodiments of the present invention is also capable of operating each component module 28a-28c independent of the other component modules. Advantageously, then, each component module can be debugged and tested independent of the other component modules of the SSMA. Thus, one or more component modules may include one or more inputs that are "hard linked" to one or more outputs of one or more component modules. Additionally, or alternatively, one or more component modules may include one or more inputs that are "soft linked" to defined, default values. Typically, each input that is hard linked to one or more outputs can alternatively be soft linked to a default value.

Reference is now made to FIG. 3, which illustrates various steps in a method of modeling, and thereafter simulating, an event, in accordance with one embodiment of the present invention. As shown in block 30, the method generally begins by executing a spreadsheet software package 24, such as Microsoft Excel, and thereafter initializing the system, such as by initializing the modeling add-in 22 within the spreadsheet software package. After initializing the modeling add-in, a user may select to create a new controller module 26 or load an existing controller module, as shown in block 32. If the user selects an existing controller module, the existing controller module can be opened, loaded or otherwise activated by the modeling add-in, as shown in block 42. If the user selects to create a new controller module, the user may direct the modeling add-in to create a new controller module, such as by formulating a new controller module without any associated component modules, as shown in block 34.

After the controller module 26 has been created, one or more component modules 28a-28c can be added to or otherwise associated with the controller module, as shown in block 36. The component modules can be added to the controller module in any of a number of different manners. In embodiments where the component modules functionally comprise spreadsheet workbooks, for example, the component modules can be added to the controller module by selecting the workbook files of the component modules in any of a number of different conventional manners. At any point after adding a component module, one or more input and/or output can be defined for the respective component module, as shown in block 38.

The inputs and outputs can be defined in accordance with any of a number of different techniques. In one embodiment where a component module 28a-28c includes one or more named ranges of one or more spreadsheet cells, for example, each input and output can be defined by selecting the name or other identifier of the respective range of cell(s), and designating the content as an input or output. In this regard, the content can be designated as an input or output in any of a number of different manners, such as by adding an "exti_" or "exto_" prefix to the name or other identifier of the respective range of cell(s), as described above.

After defining the inputs and outputs, the inputs of the component modules 28a-28c can be linked to the outputs of the component modules, as shown in block 40. As with defining the inputs and outputs, the inputs can be linked to the outputs in any of a number of different manners. In one embodiment, for example, each input for each component module can be selected, and upon selecting the input, a listing of the outputs of the component modules can be presented, such as by the display 12. Thereafter, an output to link to the selected input can be chosen from the outputs of the component modules. The process can then be repeated for each of the inputs to be linked to a respective output. In this regard, all of the inputs need not be linked to a respective output. One or more inputs, for example, can be soft linked or otherwise associated with a defined default value. In one embodiment, for example, each input of each component module can be provided with a defined default value. For those inputs not otherwise linked to an output, then, the input can be linked or otherwise associated with the defined default value.

After linking the inputs of the component modules 28a-28c to respective outputs (or default values), or after loading an existing controller module 26, the component modules can collectively model an event, such as one or more financial events. After modeling the event, the process(es) of the component modules can be performed, such as to simulate the event, as shown in block 44. As will be appreciated, the model can be simulated in accordance with any of a number of different techniques. In one embodiment, for example, the model is simulated in accordance with a method for randomly selecting the values, such as the Monte Carlo method. In such instances, the model can be simulated by performing the process(es) of each component module using a software package such as Crystal Ball.

To simulate the model of the event, each component module 28a-28c controlled by the controller module 26 can be loaded, opened or otherwise activated by the controller module. After the component modules are loaded, opened or otherwise activated, one of the component modules, typically a component module that collects results from other component modules and uses the results in process(es) performed by the respective module to generate other results to send to other component modules, can be selected. Thereafter, the process(es) of the respective component module can be performed, such as using a software package (e.g., Crystal Ball). In performing the process(es) of the selected component module, the inputs of the selected component module can be retrieved from the linked outputs. Before retrieving the linked outputs, however, the process(es) of the component modules including the linked outputs can be performed, again by a software package (e.g., Crystal Ball), for example, to determine the content of the linked outputs. As will be appreciated, in various instances the component modules including the linked outputs also include inputs linked to outputs of the selected component module and/or one or more of the other component modules. In such instances, initial values, such as defined default values, can be retrieved as the linked outputs for one or more inputs of the various component modules. And as the process(es) of the various component modules are performed with the defined default values, the content of the linked outputs can be determined and thereafter substituted for the defined default values previously retrieved in place of the respective linked outputs.

Advantageously, as explained above, as the event is simulated by performing the process(es) of the component modules, one or more of the component modules can produce a useful result, such as a result that may be analyzed by a user of the system. In addition, one or more of the component modules can be presented, such as by the display 12, independent of the other component modules and the controller module. More particularly, one or more of the component modules can be presented such that the user can observe the component modules simulating the respective processes simulated by the system. For example, one or more of the component modules can be presented such that the user can observe one or more results, such as numerical and/or graphical results, generated by the respective component modules.

Reference will now be made to FIGS. 4-11, which illustrate various presentations of the display 12 of one embodiment of the present invention, operating in the context of modeling, and thereafter simulating, the market value of a good based on future revenues and nonrecurring cost, where the market value, future revenues and nonrecurring cost models are each embodied in a separate component module. As shown and described below, the SSMA 20 of the illustrated embodiment is coupled to a spreadsheet software package 24 comprising Excel operating Crystal Ball. It should be understood, however, that the following description can be equally applied to model and simulate any of a number of different events, both in the context of financial modeling and outside the context of financial modeling. It should also understood, however, that the spreadsheet software package can comprise any of a number of other software packages, and that the spreadsheet software package need not operate with a simulation software package such as Crystal Ball.

Figure 4:
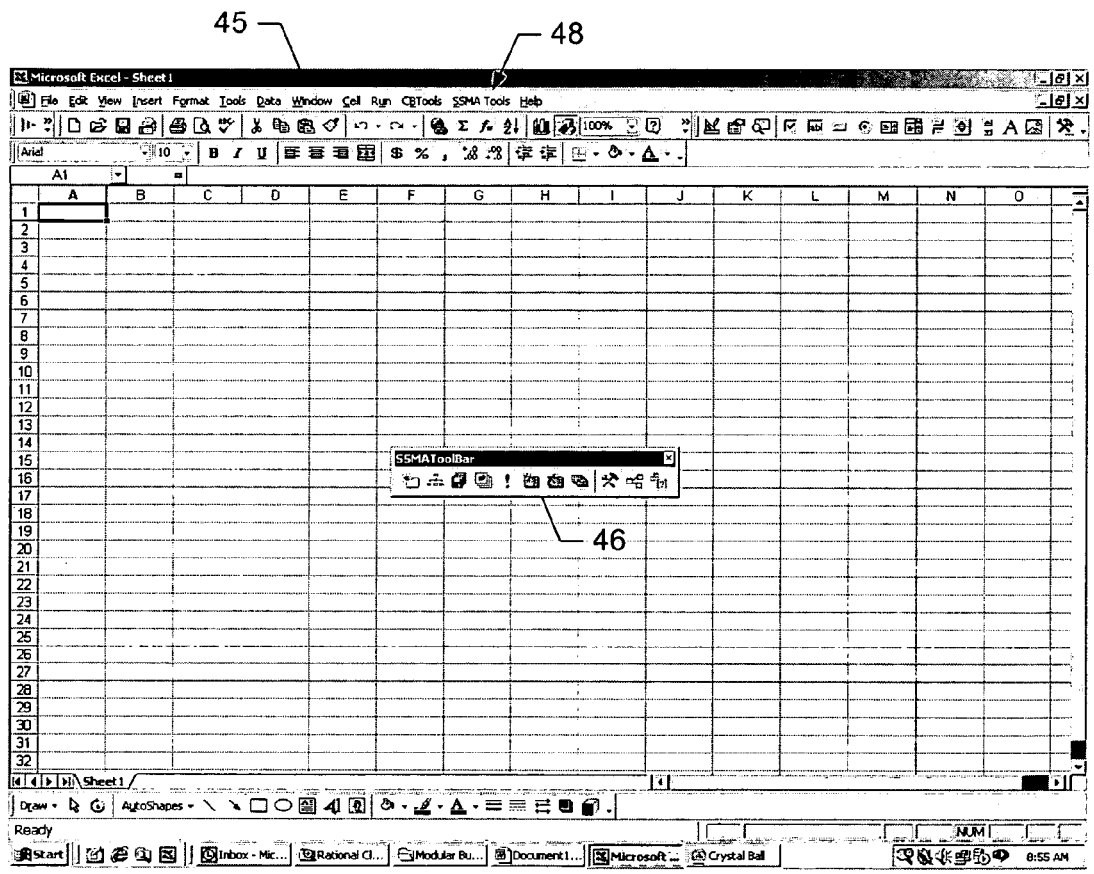
Figure 5:
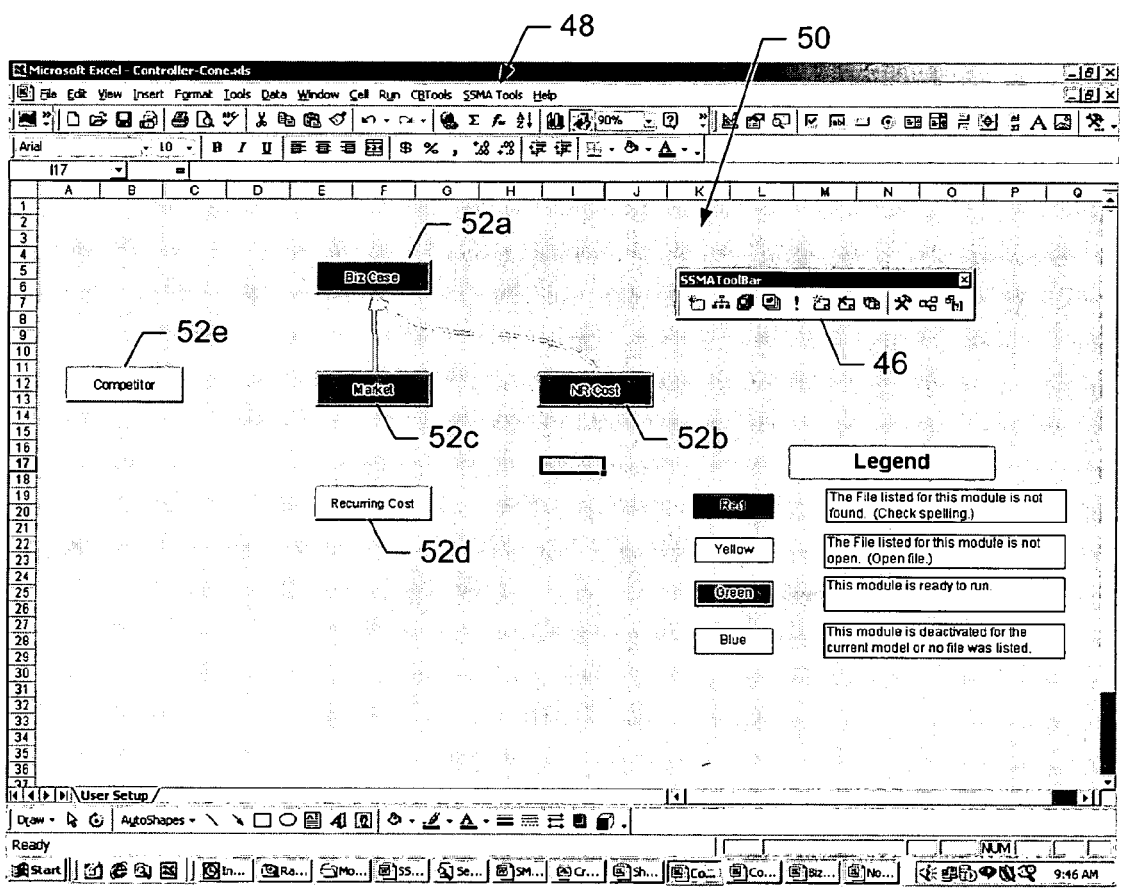

As shown in FIG. 4, after initializing the spreadsheet software package 24, the modeling add-in 22 may be initialized, such as in accordance with any conventional technique for initializing an add-in within Excel. Once initialized, the add-in can drive the display 12 to present the graphical user interface 45 of the spreadsheet software package, as well as a toolbar 46 and/or a menu 48, both of which can present various functions utilized in modeling an event using SSMA. Among those functions, the tool bar and/or menu can allow a user to direct the SSMA to create a new controller module, or open an existing controller module. As shown in FIG. 5, either after creating or loading a controller module 50 for use in modeling the market value of a good, the controller module can be presented by the display. In addition to presenting the controller module, the display can also present graphical representations of one or more component modules used to model the market value of a good.

As explained above, the controller module 50 can functionally comprise a spreadsheet workbook that can manage all of the component modules used to model the market value of a good. The controller module presented by the display can likewise include graphical representations of the component modules (illustrated as buttons) with references to the respective component modules. In addition, the controller module can include graphical representations of the links between the component modules (illustrated as arrows). As shown, for example, the controller module for modeling the market value of a good can include a graphical representation 52a of a component module 66 (see FIG. 9) for modeling the market value of the good, a graphical representation 52b of a component module 68 (see FIG. 10) for modeling a nonrecurring (NR) cost, and a graphical representation 52c of a component module 70 (see FIG. 11) for modeling a market. The illustrated controller module can also include a graphical representation 52d of a component module for modeling recurring cost, and/or a graphical representation 52e of a component module for modeling a competitor in the market. As shown and described herein, component modules 66, 68 and 70 can be linked together to model the market value of a good, while the other component modules (graphical representations 52d and 52e) may or may not be included in the model. Thus, as shown, the controller module can graphically illustrate links between the various component modules managed by the controller module.

Figure 6A:
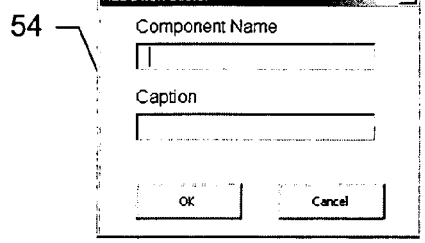
Figure 6B:
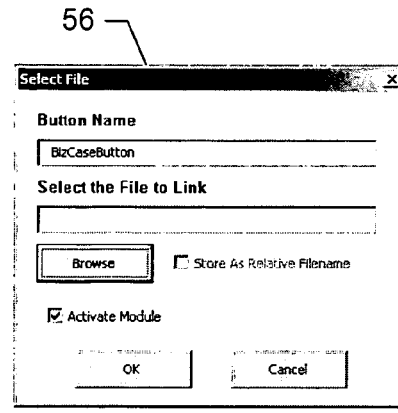

Irrespective of whether the display 12 presents an existing or newly created controller module, component modules can be added to, or deleted from, the controller module 44 at any point regardless of whether a new controller module is created or an existing controller module is loaded. For example, as shown in FIGS. 6A and 6B, to add a component module to be managed by the controller module, the display may present a dialog window 54 for adding a graphical representation (e.g., button) of a component module by supplying a name for the component module and a caption for the graphical representation of the component module. Once the graphical representation has been added, another dialog box 56 can be presented, such as by selecting the graphical representation of the new component module. Upon presenting dialog box 56, the system can receive a reference to the name of a component (e.g., workbook file name) to associate or otherwise link to the graphical representation of the new component module.

Figure 7A:
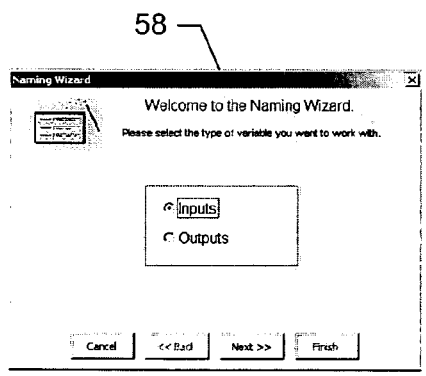
Figure 7B:
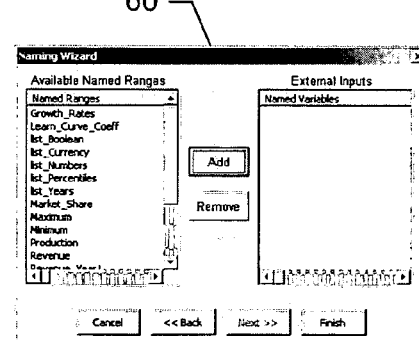

For each component module 68-70 managed by the controller module 44, one or more inputs and/or outputs can be defined. As shown in FIG. 7A, each input or output can be defined by first selecting whether to define an input or an output, such as via a selection window 58. Then, in the illustrated embodiment where the component modules comprise spreadsheet workbooks, and each workbook includes a number of named ranges of one or more cells, a list of named ranges of cell(s) can be presented in a list window 60 along with any previously defined inputs or outputs, as shown in FIG. 7B. As shown, each range of cell(s) can have an associated name such as, for example, "Learn_Curve_Coeff." By defining a range as an input, then, the range can be renamed to include a prefix identifying the range as an input or an output. Thus, the range "Learn_Curve_Coeff" can be renamed "exti_Learn_Curve_Coeff" to define an input, or renamed "exto_Learn_Curve_Coeff" to define an output. The cell ranges do not need to be named, however, and can be identified in other instances, such as by row and column. Naming the cell ranges, however, generally simplifies the process.

Figure 8A:
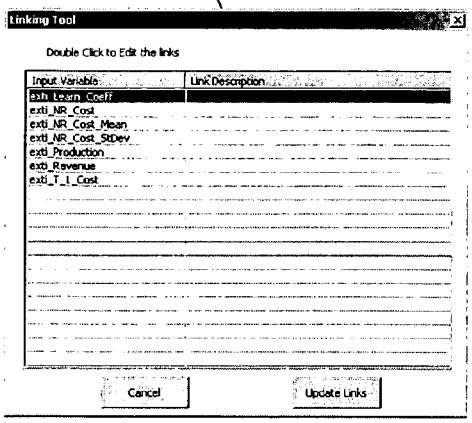
Figure 8B:
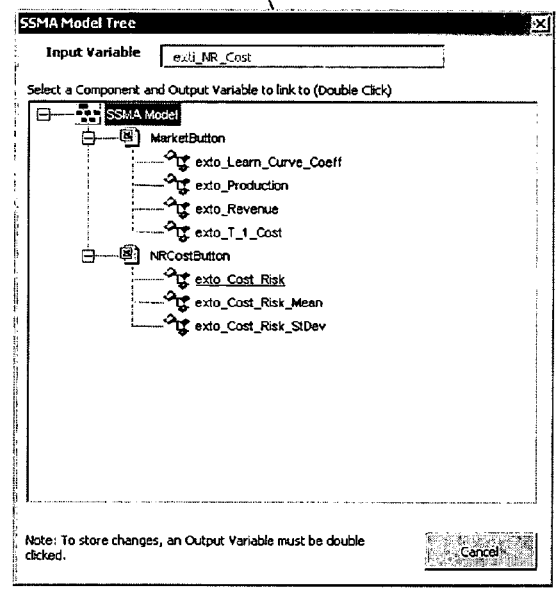
Figure 8C:
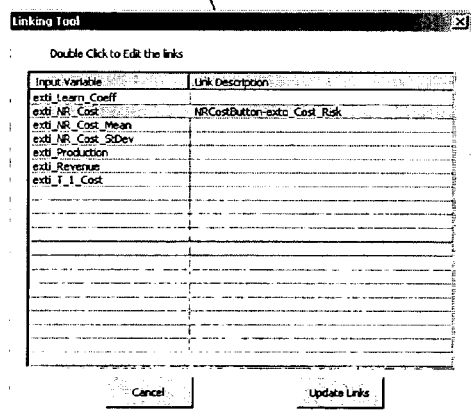

After defining the inputs and outputs, the inputs of the component modules 66-70 can be linked to the outputs of the component modules. As shown in FIG. 8A, for example, the inputs can be linked to the outputs by presenting a selection window 62 including a listing of the defined inputs for a given component module. From the listing of defined inputs, each of the inputs can be individually selected to link the selected input with an output. As shown in FIG. 8B, for example, after selecting the input "exti_NR_Cost," a tree listing of the defined outputs of the component modules can be presented in a listing window 64. From the tree listing, an output of a component module can be selected to thereby link the selected input to the selected output. Thereafter, the selected input can appear in selection window 62 as being linked to the selected output. As shown in FIG. 8C, for example, the input "exti_NR-Cost" is shown as being linked to the output "exto_Cost_Risk," where the output is defined in a component module having the name "NRCostButton." As indicated above, not every input need be linked to an output of a component module. Thus, of the inputs shown in FIGS. 8A and 8C, one or more of the inputs can be associated with respective one or more default values by not otherwise selecting an output to link to the respective input(s).

With the inputs of the component modules 66-70 linked to respective outputs (or default values), the component modules can model the market value of a good based on future revenues and nonrecurring cost. Then, if so desired, the model can be used to simulate the event (i.e., market value of a good) in any of a number of different manners. In one embodiment, for example, the process(es) of each component module are performed by a software package such as Crystal Ball to thereby simulate the market value of a good. In such an embodiment, each component module controlled by the controller module can be loaded, opened or otherwise activated by the controller module.

After the component modules 66-70 are loaded, opened or otherwise activated, one of the component modules, such as component module 66 that typically models the market value based upon results from component modules 68 and 70, can be selected, and thereafter the process(es) of the respective component module can be performed, such as using a software package (e.g., Crystal Ball). In performing the process(es) of the selected component module, the inputs of the selected component module can be retrieved from the linked outputs. Before retrieving the linked outputs, however, the process(es) of the component modules including the linked outputs can be performed, again by a software package such as Crystal Ball, for example, to determine the content of the linked outputs.

Advantageously, as explained above, as the event is simulated based upon the model, one or more of the component modules can produce a useful result, such as a result that may be analyzed by a user of the system. In addition, one or more of the component modules can be presented, such as by the display 12, independent of the of the other component modules. More particularly, one or more of the component modules can be presented such that the user can, for example, observe the component modules simulating the respective portions of the processes simulated by the system. For example, one or more of the component modules can be presented such that the user can observe one or more results, such as numerical and/or graphical results, generated by the respective component modules. For example, as explained below, component module 70 can be presented such that the user can observe the model of future revenues, such as by observing a listing the revenue values for each of a number of time segments and/or plot 82 of revenue values for a number of time segments.

Figure 9:
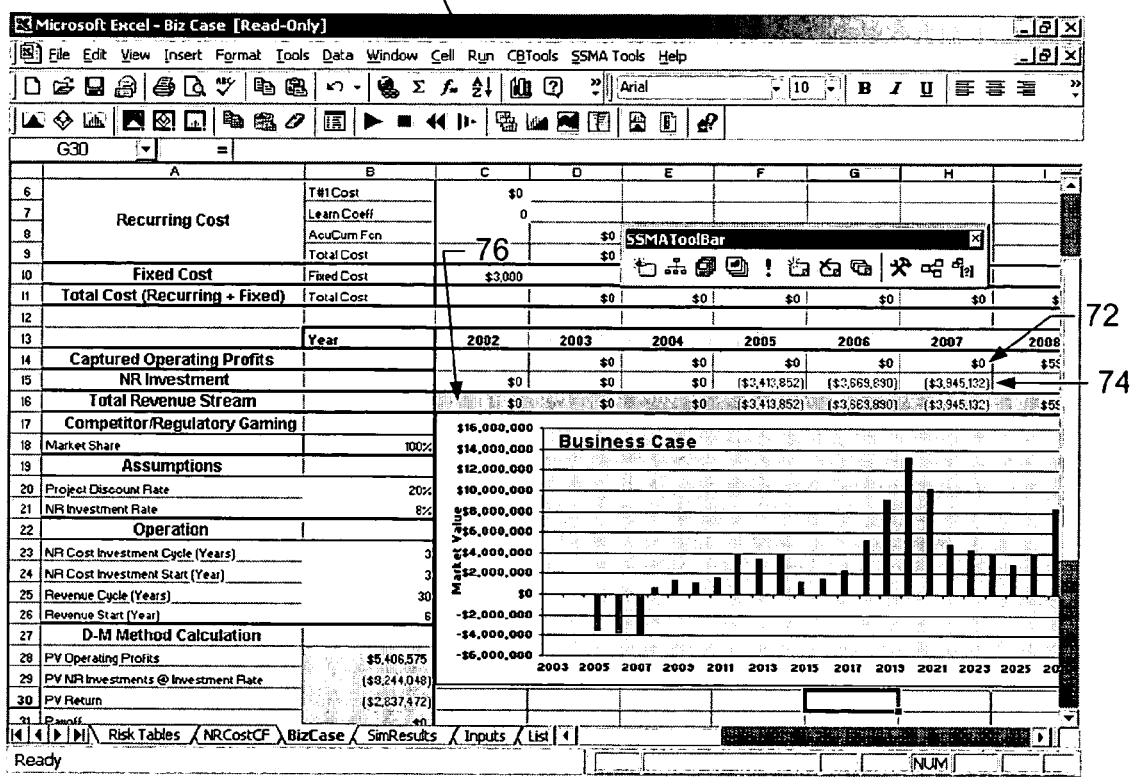

As shown in FIG. 9, the processes of the component module 66 for modeling the market value of the good can be performed to simulate the market value of a good in an uncertain market over a period of time, where the period of time is divided into a number of time segments (e.g., one-year time segments). In this regard, the market value of a good as modeled by component module 66 can be based upon a difference between revenues 72 (shown as "Captured Operating Profits") and nonrecurring costs 74 (shown as "NR Investment"). As partially shown in FIG. 9, the market value of the good 76 (shown as "Total Revenue Stream") can be shown for segments (e.g., years) of the period of time. In addition, the market value of the good can be plotted for each segment of the period of time, as shown in the illustrated graph. Advantageously, the market value of the good can be viewed in any number of ways, including those shown, as the process(es) of component module 66 are performed according to a Monte Carlo method.

As the process(es) of component module 66 are performed, the inputs of component module 66 retrieve the linked outputs of the other component modules 68 and 70. More particularly, in modeling the market value of the good, component module 66 inputs the nonrecurring costs from component module 68, and inputs the revenues from component module 70. As shown in FIG. 10, component module 68 can perform process(es) to model the nonrecurring costs 78 (shown as "Total Node Technology Cost/Risk") for each time segment of a non-recurring cost investment cycle (e.g., number of years), and output the nonrecurring costs for each segment of the investment cycle to component module 66. In this regard, component module 68 can model the nonrecurring costs in any of a number of different manners.

As illustrated in FIG. 10, for example, the process(es) of component module 68 can be performed to generate the nonrecurring costs based upon the state of development of the technologies associated with the manufacture of the good. In this embodiment, nonrecurring costs can be determined by first associating each technology associated with the nonrecurring costs to produce the good with a qualitative measure of maturity. In this regard, each qualitative measure of maturity is associated with a distribution, which can be defined by high and low nonrecurring cost values as well as a cost estimate, or more typically a most likely nonrecurring cost (shown as "Point Est."), is selected for each technology, such as by the user. To determine the mode of the risk distribution for each nonrecurring technology, the equation for the best fit curve for nonrecurring costs can be rewritten to solve for the uncertainty value f as follows:

$$f = \ln\left(\frac{MLC}{d}\right) - g \times LearningCurveValue$$

In the above equation, f represents the mode of the risk distribution for the respective nonrecurring technology, MLC represents the most likely nonrecurring cost, and d and g represent the scale factor and learning curve value sensitivity value, respectively. Also in the above equation, Learning Curve Value represents a benchmark learning curve value. Then, with the high and low nonrecurring cost values and the mode for each nonrecurring technology, a risk distribution can be defined for each nonrecurring technology. A nonrecurring cost can be selected for each nonrecurring technology, such as according to the Monte Carlo method. And thereafter, the nonrecurring costs for the nonrecurring technologies can be aggregated into a nonrecurring cost that can be output to component module 66. For more information on such a technique for modeling nonrecurring costs, see U.S. patent application Ser. No. 10/453,395, entitled: Systems, Methods and Computer Program Products for Modeling a Monetary Measure for A Good Based Upon Technology Maturity Levels, filed Jun. 3, 2003, the contents of which are hereby incorporated by reference in its entirety.

Figure 11:
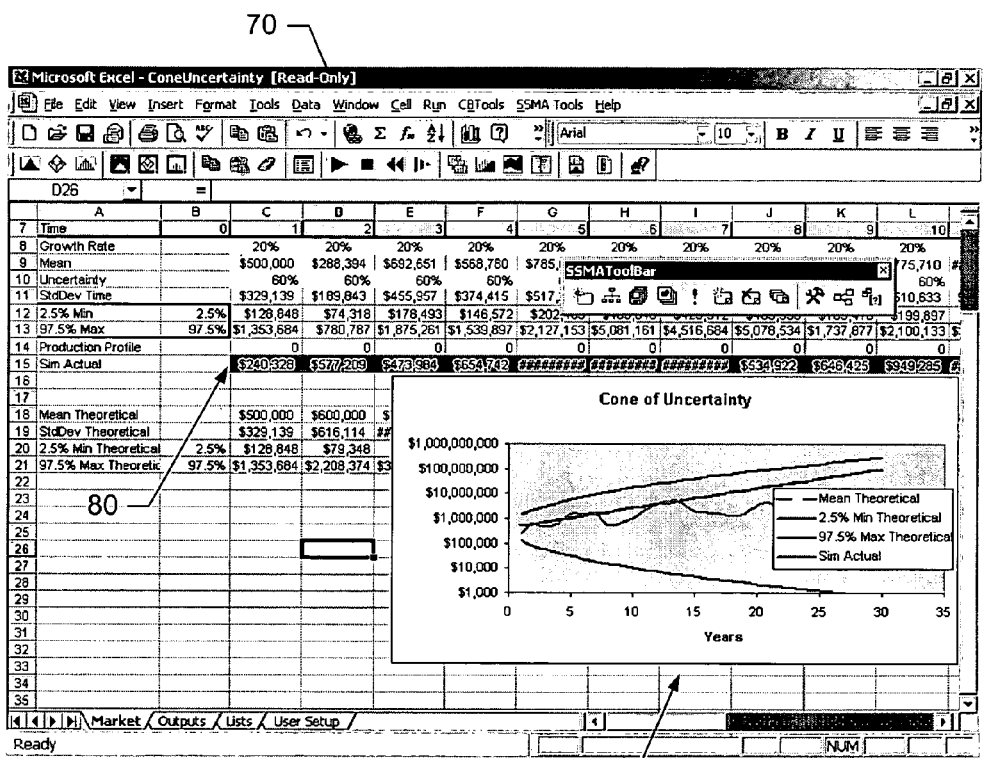

As shown in FIG. 11, the process(es) of component module 70 can be performed to thereby generate the revenues 80 (shown as "Sim Actual") for each time segment of a period of time, and output the revenues for each segment to component module 66. Similar to component module 68, component module 70 can model revenues in any of a number of different manners. As shown, the revenues can be modeled by defining the mean market value of the good for time segment t=0. Also, the growth rate of the good can be defined over the time period, where the growth rate can vary from time segment to time segment over the time period, typically beginning at time segment t=1. Either during or after defining the growth rate, uncertainty or risk in the market including the good can be determined for each time segment, typically beginning with t=1. After the growth rate has been defined and the uncertainty has been determined for each time segment in the time period, the revenue for each time segment can be modeled based upon a revenue distribution for each time segment. Each revenue distribution can be determined, for example, based upon the standard deviation in time for the respective time segment and the mean value of the good for the time segment.

The revenue distribution can be represented as any of a number of different types of distributions but, in one embodiment, the revenue distribution is defined as a log-normal distribution. Thus, to model the future revenues for the good, a revenue value for each time segment is selected from the revenue distribution for the respective time segment. Advantageously, the revenue value can be selected according to a method for randomly selecting the revenue value, such as the Monte Carlo method. In this regard, the Monte Carlo method is applied to the revenue distributions to select a revenue value for each time segment, which can be output to component module 66. Component module 70 can represent the model of future revenues in any one of a number of manners, including listing the revenue values for each time segment. Additionally, or alternatively, component module 70 can be represented as a plot 82 of revenue values for the time segments over the period of time. As shown, the component module revenue values can be plotted, such as is shown in FIG. 11 within bounds of uncertainty, often referred to as the "cone of uncertainty." For more information on such a technique for modeling revenues, see U.S. patent application Ser. No. 10/453,396, entitled: Systems, Methods and Computer Program Products for Modeling Uncertain Future Benefits, filed Jun. 3, 2003, the contents of which are hereby incorporated by reference in its entirety As shown in FIGS. 5 and 9-11, and described above, the SSMA 20 can include a controller module 44 that manages a number of component modules 66-70, which model and simulate processes associated with modeling the market value of a good based on future revenues and nonrecurring cost. It should be understood, that the controller module and component modules described above are but one of any number of controllers and component modules that can be created and utilized to model and simulate any of a number of different processes. In the financial modeling context, for example, component modules capable of modeling demand for a good and cost for the good can be linked or otherwise associated. The linked component modules can be linked with a component module capable of modeling profitability of the good based upon the demand and cost component modules. For a description of processes that could be included within the various component modules in such an instance, as well as in other instances of simulating processes in the financial modeling context, see U.S. patent application Ser. No. 10/453,727, entitled: Systems, Methods and Computer Program Products for Modeling Demand, Supply and Associated Profitability of a Good; and U.S. patent application Ser. No. 10/453,779, entitled: Systems, Methods and Computer Program Products for Determining A Learning Curve Value and Modeling Associated Profitability and Costs of A Good, both filed on Jun. 3, 2003, the contents of both which are hereby incorporated herein by reference.

According to one aspect of the present invention, the system of the present invention generally operates under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium. It should be understood that the computer-readable program code portions may include separate executable portions for performing distinct functions to accomplish methods of embodiments of the present invention. Additionally, or alternatively, one or more of the computer-readable program portions may include one or more executable portions for performing more than one function to thereby accomplish methods of embodiments of the present invention.

In this regard, FIG. 3 is a flowchart of methods, systems and program products according to the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:

providing a plurality of component modules in a spreadsheet environment, wherein each component module is configured to model a portion of a financial event and includes at least one process, wherein each component module is accessible independent of the other component modules, and wherein at least one component module includes at least one input and at least one component module includes at least one output;

linking, via a controller module, the component modules to thereby produce a model of the financial event, wherein linking the component modules includes linking an output of one of the component modules to an input of another of the component modules such that, in performing the one or more processes of the linked component modules, an output generated by one of the component modules is provided to a linked input of another of the component modules, and wherein at least one of the component modules is accessible independent of the other component modules and the controller module after linking the output to the input; and storing the controller module, the stored controller module specifying the linked component modules.

2. The method according to claim 1 further comprising:

providing a controller module; and adding a reference to each of the plurality of component modules such that the controller module is configured to link the output of one of the component modules to the input of another of the component modules based upon references added to the respective component modules.

3. The method according to claim 1 further comprising:

accessing at least one of the component modules independent of the other component modules after linking the output to the input; and altering content of the accessed at least one component module by at least one of adding content to, deleting content from, or modifying content of, the accessed at least one component module.

4. The method according to claim 1, wherein linking the component modules further includes
soft linking a defined default value to an input of one of the component modules.

5. The method according to claim 1 further comprising:
accessing the controller module such that the controller module is displayed, wherein the display of the controller module includes a graphical representation of the plurality of component modules, each graphical representation including a reference to a respective component module and including a graphical representation of the output of one of the component modules linked to the input of another of the component modules.

6. The method according to claim 1 further comprising:
accessing the controller module, wherein the controller module comprises a spreadsheet workbook,
wherein providing the plurality of component modules comprises providing a plurality of component modules each comprising a spreadsheet workbook.

7. The method according to claim 1 further comprising:
performing the at least one process of the component modules to thereby simulate the financial event, wherein performing the at least one process includes performing at least one process of one of the component modules to generate an output, and providing the generated output to a linked input of another of the component modules.

8. The method according to claim 7, wherein providing a plurality of component modules comprises providing a component module for modeling a market value, a component module for modeling a nonrecurring cost, and a component module for modeling a market including future revenues, and wherein performing the at least one process comprises performing the at least one process to thereby simulate the market value based on future revenues and nonrecurring cost.

9. The method according to claim 7, wherein providing a plurality of component modules comprises providing a component module for modeling profitability, a component module for modeling cost, and a component module for modeling a market including future demand, and wherein performing the at least one process of the component modules comprises performing the at least one process of the component modules to thereby simulate the profitability based on demand and cost.

10. The method according to claim 7, further comprising:
accessing at least one of the component modules independent of the other component modules and the controller module after linking the output to the input such that the respective at least one of the component modules can be displayed at least one of before, during or after performing the at least one process.

11. The method according to claim 7, wherein linking the component modules further includes
soft linking a defined default value to an input of one of the component modules,
and wherein performing the at least one process further includes providing the defined default value to the soft-linked input.

12. A system comprising:
a processing element configured to provide a plurality of component modules in a spreadsheet environment, wherein each component module is configured to model a portion of a financial event and includes at least one process, wherein each component module is accessible independent of the other component modules, wherein at least one component module includes at least one input and at least one component module includes at least one output, wherein the processing element is configured to operate a controller module to link the component modules to thereby produce a model of the financial event, linking the component modules including linking an output of one of the component modules to an input of another of the component modules such that, in performing the one or more processes of the linked component modules, an output generated by one of the component modules is provided to a linked input of another of the component modules, and wherein at least one of the component modules is accessible independent of the other component modules and the controller module after linking the output to the input; and
a storage medium configured to store the controller module, the stored controller module specifying the linked component modules.

13. The system according to claim 12, wherein the processing element is also configured to operate the controller module to add a reference to each of the plurality of component modules such that the processing element can operate the controller module to link the output of one of the component modules to the input of another of the component modules based upon references added to the respective component modules.

14. The system according to claim 12 further comprising:
a display configured to present at least one of the component modules independent of the other component modules after linking the output to the input such that the processing element is configured to alter content of the accessed at least one component module by at least one of adding content to, deleting content from, or modifying content of, the presented at least one component module.

15. The system according to claim 12 further comprising:
a display configured to present the controller module, wherein the presentation of the controller module includes a graphical representation of the plurality of component modules, each graphical representation including a reference to a respective component module and including a graphical representation of the output of one of the component modules linked to the input of another of the component modules.

16. The system according to claim 12, wherein the processing element is further configured to soft link a defined default value to an input of one of the component modules.

17. The system according to claim 12, wherein the processing element is configured to operate the controller module comprising a spreadsheet workbook, and operating the plurality of component modules comprising a plurality of spreadsheet workbooks.

18. The system according to claim 12, wherein the processing element is further configured to perform the at least one process of the component modules to thereby simulate the financial event, and wherein performing the at least one process includes performing at least one process of one of the component modules to generate an output, and providing the generated output to a linked input of another of the component modules.

19. The system according to claim 18, wherein the processing element is configured to provide a plurality of component modules including a component module for modeling a market value, a component module for modeling a nonrecurring cost, and a component module for modeling a market including future revenues, and wherein the processing element is configured to perform the at least one process of the component modules to thereby simulate the market value based on future revenues and nonrecurring cost.

20. The system according to claim 18, wherein the processing element is configured to provide a plurality of component modules including a component module for modeling a profitability, a component module for modeling a cost, and a component module for modeling a market including future demand, and wherein the processing element is configured to perform the at least one process of the component modules to thereby simulate the profitability based on demand and cost.

21. The system according to claim 18 further comprising:
a display configured to present at least one of the component modules independent of the other component modules and the controller module after linking the output to the input, and at least one of before, during or after the processing element simulates the process.

22. The system according to claim 18, wherein the processing element is further configured to soft link a defined default value to an input of one of the component modules, and wherein the processing element is configured to perform the at least one process by further providing the defined default value to the soft-linked input.

23. A computer program product comprising a computer-readable storage medium having computer-readable program code portions stored therein, the computer-readable program code portions, when executed by a processor, cause the processor to perform a method comprising:
providing a plurality of component modules in a spreadsheet environment, wherein each component module is configured to model a portion of a financial event and includes at least one process, wherein each component module is accessible independent of the other component modules, and wherein at least one component module includes at least one input and at least one component module includes at least one output;
linking, via a controller module, the component modules to thereby produce a model of the financial event, wherein linking the component modules includes linking an output of one of the component modules to an input of another of the component modules such that, in performing the one or more processes of the linked component modules, an output generated by one of the component modules is provided to a linked input of another of the component modules, and wherein
at least one of the component modules is accessible independent of the other component modules and the controller module after linking the output to the input; and
storing the controller module, the stored controller module specifying the linked component modules.

24. The computer program product according to claim 23, wherein the method further comprises:
providing a controller module; and
adding a reference to each of the plurality of component modules such that the second executable portion configured to link the output of one of the component modules to the input of another of the component modules based upon references added to the respective component modules.

25. The computer program product according to claim 23, wherein the method further comprises:
accessing at least one of the component modules independent of the other component modules after linking the output to the input; and
altering content of the accessed at least one component module by at least one of adding content to, deleting content from, or modifying content of, the accessed at least one component module.

26. The computer program product according to claim 23, wherein linking the component modules further includes soft linking a defined default value to an input of one of the component modules.

27. The computer program product according to claim 23, wherein the method further comprises:
accessing the controller module such that the controller module is displayed, wherein the display of the controller module includes a graphical representation of the plurality of component modules, each graphical representation including a reference to a respective component module and including a graphical representation of the output of one of the component modules linked to the input of another of the component modules.

28. The computer program product according to claim 23, wherein the method further comprises:
accessing the controller module, wherein the controller module comprises a spreadsheet workbook,
wherein the first executable portion is adapted to provide a plurality of component modules each comprising a spreadsheet workbook.

29. The computer program product according to claim 23, wherein the method further comprises:
performing the at least one process of the component modules to thereby simulate the event, wherein performing the at least one process includes performing at least one process of one of the component modules to generate an output, and providing the generated output to a linked input of another of the component modules.

30. The computer program product according to claim 29, wherein providing a plurality of component modules includes providing a component module for modeling a market value, a component module for modeling a nonrecurring cost, and a component module for modeling a market including future revenues, and wherein performing the at least one process of the component modules includes performing the at least one process to thereby simulate the market value based on future revenues and nonrecurring cost.

31. The computer program product according to claim 29, wherein providing a plurality of component modules includes providing a component module for modeling a profitability, a component module for modeling a cost, and a component module for modeling a market including future demand, and wherein performing the at least one process of the component modules includes performing the at least one process to thereby simulate the profitability based on demand and cost.

32. The computer program product according to claim 29, wherein the method further comprises:
accessing at least one of the component modules independent of the other component modules and the controller module after linking the output to the input such that the respective at least one of the component modules can be displayed at least one of before, during or after performing the at least one process.

33. The computer program product according to claim 29, wherein linking the component modules further includes soft linking a defined default value to an input of one of the component modules, and wherein performing the at least one process further includes providing the defined default value to the soft-linked input.

* * * * *